United States Patent [19]
Gioielli et al.

[11] Patent Number: 5,485,610
[45] Date of Patent: Jan. 16, 1996

[54] PHYSICAL DATABASE DESIGN SYSTEM

[75] Inventors: Michael E. Gioielli, Chelmsford, Mass.; James Ravan, Nashua, N.H.

[73] Assignee: Oracle Corporation, Redwood Shores, Calif.

[21] Appl. No.: 292,575

[22] Filed: Aug. 19, 1994

Related U.S. Application Data

[63] Continuation of Ser. No. 106,149, Aug. 13, 1993, abandoned, which is a continuation of Ser. No. 485,376, Feb. 26, 1990, abandoned.

[51] Int. Cl.⁶ ............................................. G06F 17/30
[52] U.S. Cl. .................. 395/600; 364/274.2; 364/274.5; 364/282.1; 364/283.1; 364/283.2; 364/283.4; 364/DIG. 1
[58] Field of Search .................. 395/600; 364/282.1, 364/282.2, 282.3, 283.1, 283.2, 283.4

[56] References Cited

U.S. PATENT DOCUMENTS

| | | | |
|---|---|---|---|
| 4,468,732 | 8/1984 | Raver | 364/200 |
| 4,631,664 | 12/1986 | Bachman | 364/200 |
| 4,819,160 | 4/1989 | Tanka et al. | 364/200 |
| 4,956,774 | 9/1990 | Shibamiya et al. | 364/200 |
| 5,014,197 | 5/1991 | Wolf | 364/200 |
| 5,159,687 | 10/1992 | Richburg | 395/700 |

FOREIGN PATENT DOCUMENTS 60-77249  5/1985  Japan.

OTHER PUBLICATIONS

Finkelstein et al, Physical Database Design for Relational Databases, ACM Trans. on Database Systems, vol. 13, No. 1, Mar. 1988, pp. 91–128.

Navathe, Schema Analysis for Database Restructuring, ACM Trans. on Database Systems, vol. 5, No. 2, Jun. 1980, pp. 157–184.

Humphrey, Susanne, M., "A Knowledge–Based Expert System for Computer–Assisted Indexing", IEEE Expert, 1989, pp. 25–38.

Rullo et al., IEEE Transactions on Software Eng., "An Automatic Physical Designer for Network Model Databases", vol. 14, No. 9, Sep. 1988, pp. 1293–1306.

Stanley et al., IEEE Tran. on Software Eng., "A Physical Database Design Evaluation System for CODASYL Databases", vol. 14, No. 7., Jul. 1988, pp. 1010–1022.

Nippon Denki K.K., "ACOS Software ACOS–4/MVP XE IDEA DFC 77–4", May 1985, NEC Corporation Japan.

McGraw–Hill Encyclopedia of Science and Technology; 7th Edition; No. 6, pp. 557–560.

Encyclopedia of Physical Science and Technology; Second Edition, vol. 2, Ap–Ca, pp. 52–61.

Reuter et al., *IEEE Transactions on Software Engineering*, "Automatic Design of the Internal Schema for a CODASYL Database System", vol. 10, No. 4, Jul., 1984, New York, pp. 358–375.

IEEE Transactions on Computers, *Separability—An Approach to Physical Database Design*, vol. c–33, No. 3, Mar. 1984, pp. 209–222.

ACM Transactions on Database Systems, *Resolving Conflicts in Global Storage Design Through Replication*, vol. 8, No. 1, Mar. 1983, pp. 110–135.

DDS for Physical Database Design, *Physical Database Design: A DDs Approach*, 1983, pp. 211–224.

*Primary Examiner*—Kevin A. Kriess
*Assistant Examiner*—Dennis M. Butler
*Attorney, Agent, or Firm*—Fish & Richardson

[57] ABSTRACT

A physical database designer which is embodied in computer software that generates a physical database design. The designer follows a process which includes the steps of (a) entering a logical schema representing the database to be designed; (b) entering a hierarchial definition of the workload experienced by the database, which includes, for each level of a hierarchy of operations, a separate specification of workload; and (c) applying expert rules to the logical schema and the workload definition to generate the physical database design.

5 Claims, 4 Drawing Sheets

Microfiche Appendix Included
(34 Microfiche)

ENTER DESIGN INPUT

100 CREATE A PHYSICAL DESIGN
(PROMPT USER FOR NAME OF THE LOGICAL
SCHEMA AND WORKLOAD)
↓
102 CREATE AND INSTANCE OF LOGICAL
SCHEMA
↓
104 UNIQUE? —————No—————→ 106 RETURN ERROR
↓ Yes
108 CREATE INSTANCES FOR EACH
ENTITY, ATTRIBUTE, RELATIONSHIP, IN
THE LOGICAL SCHEMA
⋮
↓
112 CREATE VOLUME INSTANCES FOR
EACH ENTITY IN THE LOGICAL SCHEMA
↓
114 CREATE INSTANCE OF WORKLOAD
↓
116 UNIQUE? —————No—————→ 118 RETURN ERROR
↓ Yes
120 CREATE INSTANCE FOR EACH
REQUEST, TRANSACTION, PROGRAM, AND
APPLICATION IN THE WORKLOAD
↓
122 VALIDATE EACH REQUEST AGAINST
THE ENTITY INSTANCES FOR THE LOGICAL
SCHEMA (PROMPT USER TO RESOLVE ANY
INCONSISTENCIES)

FIG. 2

GENERATE PHYSICAL DESIGN

302 ANALYZE THE APPLICATIONS, PROGRAMS, TRANSACTIONS AND REQUESTS TO DETERMINE THE ACCESS ENTRIES TO EACH ENTITY

304 RETRIEVE THE IMPORTANCE FOR EACH REQUEST IN THE TRANSACTION AND PROGRAM

306 DETERMINE THE CRITICAL ACCESS TO EACH ENTITY

308 ANALYZE THE CRITICAL ACCESS METHODS ENTRIES TO DETERMINE THE DESIRED ACCESS MODE AND ACCESS FIELD (ATTRIBUTE) FOR EACH ENTITY

310 CREATE ACCESS METHOD INSTANCES FOR EACH UNIQUE CRITICAL ACCESS AND ENTITY COMBINATION

312 ANALYZE CRITICAL ACCESS ENTRIES TO DETERMINE PLACEMENT INSTANCE FOR EACH ENTITY

314 ANALYZE TRANSACTION INSTANCES (FOR RELATIONAL DATABASES) OR RELATIONSHIP INSTANCES (FOR CODASYL DATABASES) AND REQUEST INSTANCES TO DETERMINE THE INTERRELATIONSHIPS BETWEEN ENTITIES

316 GENERATE CLUSTERS FOR INTERRELATED ENTITIES

318 ANALYZE CLUSTERS TO DETERMINE THE MAPPING OF ENTITIES TO STORAGE AREAS AND STORAGE MAPS

320 CREATE INSTANCES OF STORAGE AREAS, STORAGE MAPS, STORAGE PARTITIONS, AND STORAGE INDICES

322 USE ACCESS METHOD TO DETERMINE STORAGE INDEX

(34 Microfiche)

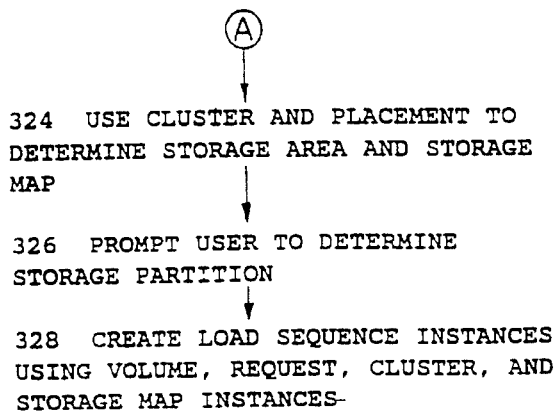

324 USE CLUSTER AND PLACEMENT TO DETERMINE STORAGE AREA AND STORAGE MAP

326 PROMPT USER TO DETERMINE STORAGE PARTITION

328 CREATE LOAD SEQUENCE INSTANCES USING VOLUME, REQUEST, CLUSTER, AND STORAGE MAP INSTANCES

FIG.3a

OUTPUT DESIGN

400 CREATE LOGICAL SCHEMA: ACCESS INSTANCES OF LOGICAL SCHEMA, ENTITY, ATTRIBUTE, AND RELATIONSHIP TO CREATE MODEL SPECIFIC DDL

402 CREATE STORAGE SCHEMA: ACCESS INSTANCES OF RECORD FORMAT, STORAGE SCHEMA, STORAGE AREA, STORAGE MAP, STORAGE INDEX, AND STORAGE PARTITION TO CREATE MODEL SPECIFIC DDL

404 CREATE CREATION PARAMETERS: ACCESS INSTANCES OF STORAGE AREA, IMPLEMENTATION PRODUCT, AND DESIGN CONSTRAINTS TO CREATE MODEL SPECIFIC CREATION COMMANDS

406 CREATE RUNTIME PARAMETERS: ACCESS INSTANCES OF IMPLEMENTATION PRODUCT, DESIGN CONSTRAINTS, STORAGE AREA, AND STORAGE MAP TO CREATE MODEL SPECIFIC RUNTIME COMMANDS

410 CREATE DESIGN REPORT: ACCESS INSTANCES OF LOGICAL SCHEMA, ACCESS METHOD, PLACEMENT, CLUSTER, STORAGE SCHEMA, STORAGE AREA, STORAGE MAP, AND LOAD SEQUENCE TO CREATE DESIGN REPORT

FIG.4

PHYSICAL DATABASE DESIGN SYSTEM

This is a continuation of application Ser. No. 08/106,149, filed Aug. 13, 1993, now abandoned, which is a continuation of application Ser. No. 07/485,376, filed Feb. 26, 1990, now abandoned.

REFERENCE TO MICROFICHE APPENDIX

The application includes a microfiche appendix pursuant to 37 CFR §1.96(b) containing 34 microfiche having 1729 frames.

BACKGROUND OF THE INVENTION

The invention relates to the physical design of a database.

Database systems are typically not self-optimizing in terms of their physical design. That is, they do not automatically alter the particular layout and storage characteristics of their data and operations. Most systems do include features that allow a user to specify certain settings, such as a choice of indexed or sequential keys for data records, the expected size of data files, or the storage locations of the data and program files. However, the appropriate settings of these and other features usually requires unique expertise that a general user does not possess.

A human database expert, therefore, is usually required to fine tune the physical design of a database in order to provide better runtime performance. For example, the expert can make some improvements that yield a higher application throughput (i.e., a greater number of transactions processed) by reducing the number of necessary input/output operations (I/Os) and conducting more efficient buffering of data in memory. Other improvements include providing more efficient utilization of the central processing unit (CPU) and disk storage units by partitioning data across multiple disks, calculating optimal data density (i.e., providing large enough storage areas to contain each section of data), and calculating optimal placement of data within the data files.

As noted, the physical structure of a database can be defined as the particular storage characteristics of a collection of interrelated data stored as one or more stored records. A stored record is the basic unit of storage which corresponds to one logical record and contains all pointers, record lengths, and other identifiers necessary to represent pieces of data. Aspects of the physical structure of a database include, for example, the location and size of files, the access methods and keys to database records, and the placement of records within the database. Not surprisingly, the design of the physical structure has a significant impact on performance of the database as a whole. This impact, however, can differ from database to database (even among databases having the same physical structure). For example, the physical structure's impact on performance can vary depending on the amount of data in the database (i.e., the "data volume"). The impact can also vary depending on the "physical constraints" of the system, e.g., the number of storage devices available, the amount of space available on the storage devices, the amount of I/O taking place, and the amount of random access memory (RAM) available. And finally, the impact can vary depending on the "workload" of the database, e.g., the type, frequency, priority, and sequence of database operations.

SUMMARY OF THE INVENTION

In general, the invention features a physical database designer which is embodied in computer software that generates a physical database design. The designer follows a process which includes the steps of (a) entering a logical schema representing the database to be designed; (b) entering a hierarchial definition of the workload experienced by the database, which includes, for each level of a hierarchy of operations, a separate specification of workload; and (c) applying expert rules to the logical schema and the workload definition to generate the physical database design.

In preferred embodiments, the physical database design generated by the designer can be a relational database or a codasyl database. Another feature of the preferred embodiment provides that the designer compares the workload's different operations on the database by normalizing the hierarchical workload definition so that the operations are treated uniformly when creating the physical database design. Also, the workload hierarchy includes at least three levels: programs, transactions within programs, and requests within transactions. A fourth level, applications, is possible as well and denotes groupings of related programs. In the embodiment discussed below, the information contained in the workload definition includes the importance of operations at different levels of the hierarchy, the frequency of operations at different levels of the hierarchy, and the access mode and lock mode of transactions. Other types of information might likewise be stored. Finally, one element of the improved physical database design generated by the designer is a definition of record placement, i.e., a particularly efficient storage layout for the data based on the workload and other inputs. For example, the designer can use the following as inputs, (a) a volume definition for the database which includes information on the number of occurrences of the operation such as the volatility, the minimum and maximum number of occurrences; and (b) a physical constraints definition for the database which indicates the size of main memory available to the database, the size of disk memories on which records in the database are stored, and the maximum number of concurrent users of the database.

The invention automates the design of the physical structure of a database and allows users to improve the performance of the database and any applications that rely on it. To do this, the system applies information regarding the data volume, physical constraints, and workload of the database to the design of the physical structure of the database. The information regarding the data volume and physical constraints can be generated by hand or input from various database dumps. Likewise, the workload analysis can be generated by hand or by an application event-based data collector such as that described in a copending application by Philip K. Royal, entitled SYSTEM AND METHOD FOR APPLICATION EVENT COLLECTION, filed on even date with this application.

The invention can be used to design databases that use storage space efficiently and that partition data across the available storage space to reduce the I/O overhead of database operations. For example, if the workload analysis indicates that operations on two particular objects (i.e., pieces of data) often occur in sequence, the invention recommends that objects be placed in proximity to one another on the storage device to minimize the number of I/O operations necessary to access the objects. In addition, the system can also size data according to the workload of the database and indicate how to arrange the data in "clusters" or groups within a database file. That is, the system stores related record types, e.g., all records processed by a particular database request or transaction, in the same area of the database. This technique helps to prevent excessive disk head movement that slows response time.

Other advantages and features will become apparent from the following description, and from the claims.

DESCRIPTION OF THE PREFERRED EMBODIMENT

FIG. 2 is a flow chart which illustrates the steps necessary to enter design inputs, i.e., logical schema, workload, volume, and constraints.

FIG. 3 is a flow chart which illustrates the steps necessary to generate the physical structure.

FIG. 4 is a flow chart which illustrates the steps necessary to output the creation parameters and runtime parameters to implement the physical structure.

Figure 1:
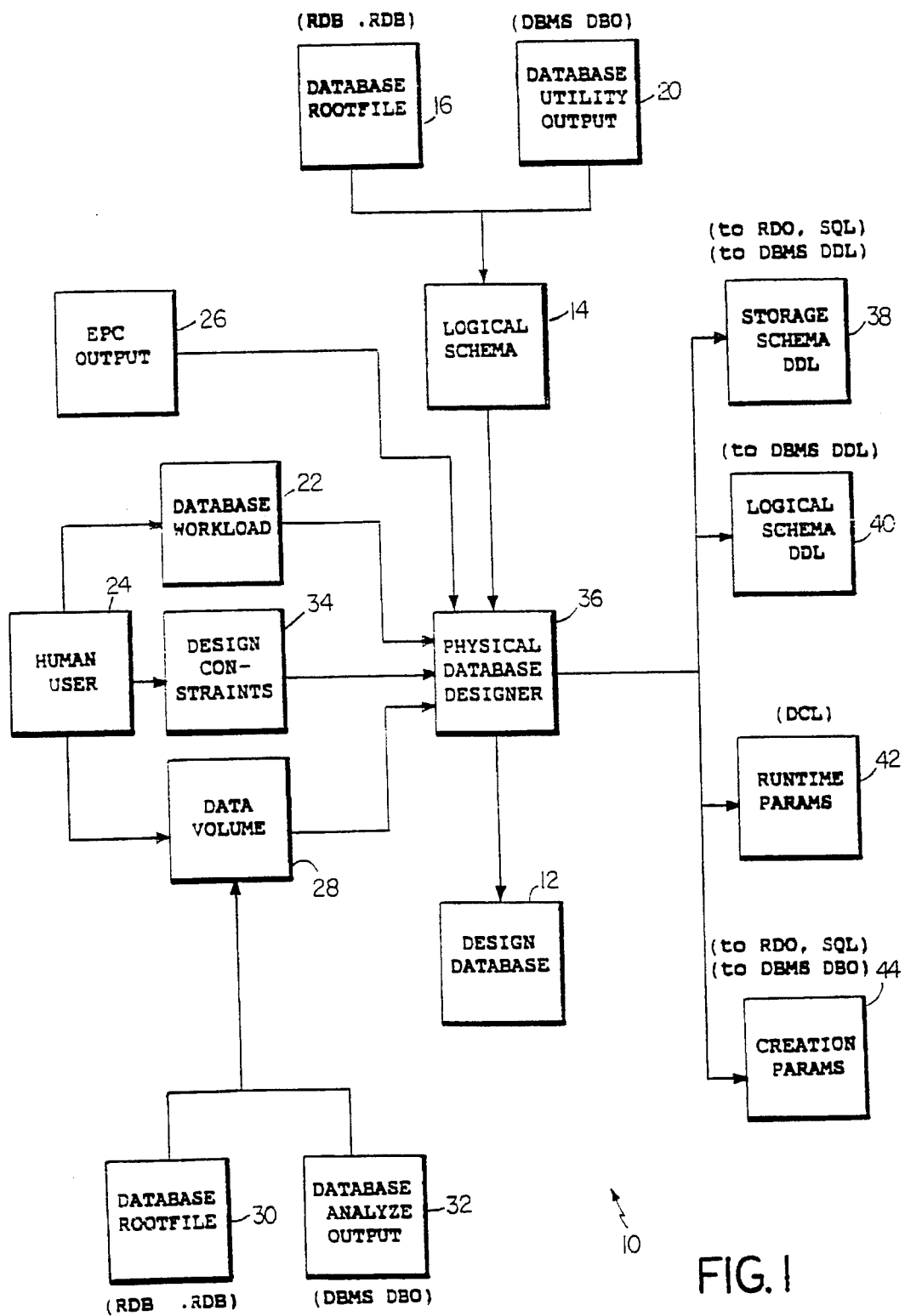
FIG. 1 is a block diagram of the components of a physical database design system according to the present invention.

Table 1 is a sample logical database design (logical schema) used by the system.

Table 2 is a sample workload definition used by the system.

Table 3 is a sample data volume definition used by the system.

Table 4 is a sample physical constraints definition used by the system.

Table 5 (supplied in Appendix A) is a sample output of creation parameters and runtime parameters necessary to create the physical structure produced by the system.

Shown in block diagram form in FIG. 1, the present invention is a physical database design system 10 which assists a user in the fine tuning of a database by applying a set of rules to a logical database structure 14 (also referred to as a "logical schema"). For example, the rule shown below determines whether a database table should be placed according to its type and index structure. Other example rules are supplied in Appendix A attached hereto. Generally, records of the same type and their associated index structure are stored on the same database page so that a retrieval of an index key at the particular page also retrieves the data associated with that key. Thus, the number of I/O operations caused by page retrievals is reduced and the performance of the database is improved.

---

Domain: VAX Rdb/VMS
Context: Table placement
Source: VAX Rdb/VMS Documentation
Rule #: 1

"If a table has an index, and is accessed by a direct key, and and its importance is higher than sequential importance then this table ia a candidate for placement."
Rule:
If —> table has a hash index as its best index, and the index importance > sequential importance for the object and there is no instance in pdd$place
Then —> place the table via its hash index and set the placement type to direct.

---

Referring again to FIG. 1, the logical schema 14 can be derived from several sources, including a database rootfile 16 or a database utility output 20. The database utility output is a language file, e.g., Data Definition Language (DDL), that is parsed via a YET Compiler Compiler (YACC) parser to create a generic internal representation, i.e., the logical schema 14. Thus, the system 10 can accept and improve the design of any type of database, e.g., a CODASYL or a relational database.

To improve the logical schema 14 described above, the system 10 relies upon the rules and also upon the following: a database workload definition 22, which can be generated by a human user 24 or derived from the output of an event performance collector 26; a data volume definition 28, which can be generated by the user or derived from a database rootfile 30 or database utility output such as the "database analyze output" 32 shown in FIG. 1; and a design constraints definition 34 which can be generated by the user.

A physical database designer 36 also shown in FIG. 1 applies the information of the workload 22, the data volume 28, the design constraints 34, and the rules to the logical schema 14. The results of this application include a storage schema 38, i.e., a physical database structure which defines the on-disk structure of the logical schema 14. This physical structure is accompanied by a set of runtime parameters 42 and a set of creation parameters 44.

The user can use the creation parameters 44 to implement the physical database structure 38, and use the runtime parameters 42 to unload data from an old database and reload it in the new database. A detailed description of each of the components described in connection with FIG. 1, beginning with the logical schema 14, is provided below in connection with FIGS. 2–7.

Structure of the Logical Schema

The logical schema 14 of FIG. 1 can be thought of as defining record and field structures with which data entities are associated. An example of a logical schema 14 for a personnel database is shown below in Table 1. As shown, the schema includes a number of tables, i.e., COLLEGES, DEGREES, DEPARTMENTS, EMPLOYEES, JOBS, JOB_HISTORY, RESUMES, SALARY_HISTORY, and WORK_STATUS. Each table can be thought of as the definition of a record data structure. Each table also has a number of column elements which can be thought of as fields in the record. For example, the COLLEGES table includes the column elements COLLEGE_CODE, COLLEGE_NAME, CITY, STATE, and POSTAL CODE. Each column element has associated with it a data type, e.g., character, integer, or date. The data entities which later fill the "rows" under the column elements can be related by their data type, but can also form relationships to one another by their appearance in multiple tables. For example, the COLLEGE_CODE column element appears in the COLLEGES table and the DEGREES table.

TABLE 1

Tables in shema Personnel
  COLLEGES
  DEGREES
  DEPARTMENTS
  EMPLOYEES
  JOBS
  JOB_HISTORY
  RESUMES
  SALARY_HISTORY
  WORK_STATUS
Columns in table COLLEGES

| Column Name | Data Type |
|---|---|
| COLLEGE_CODE | CHAR (4) |
| COLLEGE_NAME | CHAR (25) |
| CITY | CHAR (20) |
| STATE | CHAR (2) |
| POSTAL_CODE | CHAR (5) |

Columns in table DEGREES

| Column Name | Data Type |
|---|---|
| EMPLOYEE_ID | CHAR (5) |

TABLE 1-continued

| | |
|---|---|
| COLLEGE_CODE | CHAR (4) |
| YEAR_GIVEN | SMALLINT |
| DEGREE | CHAR (4) |
| DEGREE_FIELD | CHAR (20) |
| Columns in table DEPARTMENTS | |
| Column Name | Data Type |
| DEPARTMENT_CODE | CHAR (4) |
| DEPARTMENT_NAME | CHAR (30) |
| MANAGER_ID | CHAR (5) |
| BUDGET_PROJECTED | INTEGER |
| BUDGET_ACTUAL | INTEGER |
| Columns in Table EMPLOYEES | |
| Column Name | Data Type |
| EMPLOYEE_ID | CHAR (5) |
| LAST_NAME | CHAR (14) |
| FIRST_NAME | CHAR (10) |
| MIDDLE_INITIAL | CHAR (1) |
| ADDRESS_DATA_1 | CHAR (25) |
| ADDRESS_DATA_2 | CHAR (25) |
| CITY | CHAR (20) |
| STATE | CHAR (2) |
| POSTAL_CODE | CHAR (5) |
| SEX | CHAR (1) |
| BIRTHDAY | DATE |
| STATUS_CODE | CHAR (1) |
| Columns in table JOBS | |
| Column Name | Data Type |
| JOB_CODE | CHAR (4) |
| WAGE_CLASS | CHAR (1) |
| JOB_TITLE | CHAR (20) |
| MINIMUM_SALARY | INTEGER |
| MAXIMUM_SALARY | INTEGER |
| Columns in table JOB_HISTORY | |
| Column Name | Data Type |
| EMPLOYEE_ID | CHAR (5) |
| JOB_CODE | CHAR (4) |
| JOB_START | DATE |
| JOB_END | DATE |
| DEPARTMENT_CODE | CHAR (4) |
| SUPERVISOR_ID | CHAR (5) |
| Column in table RESUMES | |
| Column Name | Data Type |
| EMPLOYEE_ID | CHAR (5) |
| Column in table SALARY_HISTORY | |
| Column Name | Data Type |
| EMPLIYEE_ID | CHAR (5) |
| SALARY_AMOUNT | INTEGER |
| SALARY_START | DATE |
| SALARY_END | DATE |
| Columns in table WORK_STATUS | |
| Column Name | Data Type |
| STATUS_CODE | CHAR (1) |
| STATUS_NAME | CHAR (8) |
| STATUS_TYPE | CHAR (14) |

The database workload 22 defines database transactions performed on the data entities in the tables and column elements shown above and is described next in connection with an example workload for the personnel database.

Structure of the Database Workload

The database workload definition 22, an example of which is shown below in Table 2, describes the expected database operations on the data entities in the tables and column elements defined in the logical schema 14. In the workload 22, the operations on the logical schema 14 (i.e., applications, programs, transactions, and requests) are arranged in a hierarchical fashion. That is, an application includes one or more programs; a program includes one or more transactions; and a transaction includes one or more requests. Briefly, then, within this hierarchical structure, the workload 22 defines which tables of the logical schema 14 are accessed, how the tables are accessed (access mode, lock mode, and operation), how frequently they are accessed (frequency and cycle), and how important it is that a operation complete in the shortest time possible importance).

TABLE 2

Workload for Schema Personnel;
Application EMPLOYEES
    Importance 10;
Program JOBINFO
    Cycle DAILY
    Frequency 80.00
    Importance 10;
Transaction CHECK_DEPT_INFO
    Access_mode READ ONLY
    Lock_mode SHARED
    Frequency 1.00
    Importance 10;
Request DEPTCODE_1
    Frequency 1.00
        SELECT column_list FROM JOB_HISTORY
            WHERE DEPARTMENT CODE = "literal";
Request DEPTCODE_2
    Frequency 1.00
        SELECT column_list FROM JOB_HISTORY
            WHERE DEPARTMENT_CODE = "literal"
            AND JOB_END > "literal";
Transaction CHECK_EMPLOYEE_EXISTANCE
    Access_mode READ ONLY
    lock_mode SHARED
    Frequency 1.00
    Importance 10;
Request EMPIDCHK_1
    Frequency 1.00
        SELECT column_list FROM EMPLOYEES
            WHERE EMPLOYEE_ID = "literal";
Request EMPIDCHK_2
    Frequency 1.00
        SELECT column_list FROM JOB_HISTORY
            WHERE EMPLOYEE_ID = "literal";
Transaction CHECK_JOB_INFO
    Access_mode READ ONLY
    Lock_mode SHARED
    Frequency 1.00
    Importance 10
Request JOBCODE_1
    Frequency 1.00
        SELECT column_list FROM JOBS
            WHERE JOB_CODE = "literal";
Request JOBCODE_2
    Frequency 1.0
        SELECT column_list FROM JOBS_HISTORY
            WHERE JOB_CODE = "literal";
Transaction MODIFY_EMP_STATUS
    Access_mode READ WRITE
    Lock_mode PROTECTED
    Frequency 1.00
    Importance 10;
Request MODEMP1
    Frequency 1.00
        UPDATE EMPLOYEES SET EMPLOYEE_ID =
        "literal"
            WHERE EMPLOYEE_ID = "literal";
Request MODEMP2
    Frequency 1.00
        UPDATE JOB_HISTORY SET EMPLOYEE_ID =
        "literal"
            WHERE EMPLOYEE_ID = "literal";
Request MODEMP3
    Frequency 1.00
        UPDATE SALARY_HISTORY SET SALARY_END =
        "literal"
            WHERE EMPLOYEE_ID = "literal";
Transaction MODIFY_JOBEND_DATE
    Access_mode READ WRITE
    Lock_mode EXCLUSIVE
    Frequency 1.00
    Importance 10;

TABLE 2-continued

```
Request JOBEND
    Frequency 1.00
        UPDATE JOB_HISTORY SET EMPLOYEE_ID =
        "literal"
            WHERE EMPLOYEE_ID = "literal"
            AND JOB_END > "literal";
Transaction MODIFY_SALEND_DATE
    Access_mode READ WRITE
    Lock_mode PROTECTED
Request SALEND
    Frequency 1.00
        UPDATE SALARY_HISTORY SET SALARY_END =
        "literal"
            WHERE EMPLOYEE_ID = "literal"
            AND SALARY_END > "literal"
            AND SALARY_END <> "literal"
            AND SALARY_END >= "literal"
            AND SALARY_END <= "literal"
Request STORESAL
    Frequency 1.00
        INSERT INTO SALARY_HISTORY (column_list)
        VALUES (value_list);
Transaction STORE_JOBDEPT
    Access_mode READ WRITE
    Lock_mode EXCLUSIVE
    Frequency 1.00
    Importance 10
Request JOBSTORE
    Frequency 1.00
        INSERT INTO JOB_HISTORY (column_list)
        VALUES (value_list);
```

Access to data entities in a table is defined by several conditions. First, an access mode statement defines the type of operation that a particular column element is the object of, e.g., a READ, WRITE, or UPDATE operation. Second, a lock mode statement defines whether the data entity can be accessed simultaneously by more than one operation, e.g., whether the column element allows SHARED, EXCLUSIVE, or PROTECTED access. For example, data entities in the EMPLOYEES table shown above are accessed by a CHECK_DEPT_INFO transaction which defines all requests for operations on the table as READ ONLY and SHARED. Finally, the column elements by which data entities in a table are usually accessed are specified in requests. For example, in the request DEPTCODE_1 shown in Table 2 the data entities in the table DEPARTMENTS are accessed by the DEPARTMENT_CODE column element.

The frequency of access to a table is defined by the number of times the data entities in a table are accessed in a particular cycle of time, i.e., the number of times per hour, day, week, month, quarter, or year. If a table is usually accessed by a particular column element, the frequency of access via that element can be very high in a single cycle. For example, the EMPLOYEES table might be accessed by the EMPLOYEE_ID column element 50 or 100 times a day. On the other hand, if an table is seldom accessed by the contents of a different column element, the frequency of access can be very low in a single cycle. For example, the EMPLOYEE table might be accessed by the ADDRESS_DATA_1 column element only once a week.

The importance of an application, program, or transaction is a ranking on a scale of one to ten which corresponds to how important it is that the operation complete in the shortest time possible. For example, an application might be considered fairly important and rank a score of 8, while a program within the application might be very important and rank a score of 10. In some specific cases, rankings may seem to conflict with one another. For example, a transaction that looks up an employee's phone number and is performed many times a day, may seem at first to outrank a transaction which looks up an employee's address for payroll processing once a week. However, the payroll processing is likely considered a transaction which outranks other transactions and so requires a higher rating.

Generally, the importance ratings determine several details of the final storage schema 38, e.g., the critical access paths in the schema. Thus, by carefully selecting an importance for each application, program, and transaction, a user can create a workload definition 22 that identifies which aspects of the database design to optimize. A description of each type of operation on the logical schema, i.e., application, program, transaction, and request, follows.

An application is a collection of programs that perform a distinct business function. For example, the "EMPLOYEES" application shown in Table 2 above retrieves and updates information about a company's employees, via individual programs such as "JOBINFO." Note that applications are typically not defined by an access mode, lock mode, frequency, or cycle since they are merely a means for grouping related programs. However, the importance of the application is defined, specifically, as a function of the importance of the programs within the application. For example, the EMPLOYEES application is rated at 8.

Next, a program, e.g., JOBINFO, is a collection of transactions which performs a specific function or task. The workload 22 defines a separate program for each executable image or command procedure that accesses the database, e.g., application programs, or VAX Datatrieve, SQL, or DBQ procedures. Within each application, the frequency, cycle, and importance for each program is defined. For example, the cycle of the JOBINFO program is defined as DAILY, its frequency is 80.00, and its importance is 10.

Next, a transaction is a recoverable unit of database activity. For example, JOBINFO includes the transactions CHECK_DEPT_INFO, CHECK_EMPLOYEE_EXISTENCE, and CHECK_JOB_INFO. The access mode for the CHECK_DEPT_INFO transaction is defined as READ ONLY, the lock mode is SHARED, the frequency is 1.00, and the importance is 10. Note that all transactions have the same cycle, i.e., one execution of the program.

Finally, each transaction is a collection of requests, i.e., single database accesses. Each access is written in a database language such as SQL or DML. For example, referring again to Table 2, the first request in the CHECK_DEPT_INFO transaction is the "DEPTCODE_1" request which is defined by the SQL statement: "SELECT column_list FROM DEPARTMENTS WHERE DEPARTMENT_CODE="literal" AND JOB_END>"literal".

The workload definition 22 as defined above is input to the physical database designer 36 and analyzed by an expert system to create an optimal physical design. A description of the analysis done by the expert system on the workload 22 is presented below.

Analysis of Workload Definition (KB_ANALYSIS)

The analysis and characterization of the workload 22 is the first step in the design process once all of the design inputs have been obtained. The analysis includes the steps of annualizing the frequencies based on processing cycle, normalizing the frequencies for the transactions and requests, and creating an absolute importance for each request.

The expert system within the physical database designer 36 contains a module KB ANALYSIS which performs several operations on the workload data in order to determine certain details of "the improved database design, i.e., the final storage structure 38. First, KB_ANALYSIS "annualizes" the occurrences of each request in the workload definition 22. That is, it converts the number of occurrences from the number of occurrences per cycle to the number of occurrences per year. For example, if the cycle is hourly, KB_ANALYSIS annualizes the number of occurrences by multiplying hours per day * days per week , weeks per month , months per quarter * quarters per year.

Second, KB_ANALYSIS "normalizes" the occurrences of transactions and requests so that the execution counts can be accurately compared. To do this, KB_ANALYSIS first updates the absolute count of transactions by multiplying the execution count of transactions by the execution count of programs and assigning the result to the absolute count of transactions. Then, KB_ANALYSIS updates the absolute number of requests by multiplying the absolute count of transactions by the execution count of requests and assigning the result to the absolute number of requests.

Third, KB_ANALYSIS normalizes the importance rating of the requests so that the ratings of all requests in the workload can be accurately compared. That is, the importance of each request is calculated based on the importance of the application, program, and transaction in which the request occurs. To calculate the relative importance of each request, KB_ANALYSIS uses the following algorithm:
request importance=request absolute frequency/(importance high bound−request importance)$^2$
Where:

--- importance high bound = application multiplier +
    program multiplier +
    transaction multiplier +
    request multiplier + 1 request importance =
    application importance * application multiplier +
    program importance * program multiplier +
    transaction importance * transaction multiplier +
    request importance * request multiplier

---

And where any multiplier=10**(level-1). For example,

---

| application multiplier | = 10**3 = 1000 |
| program multiplier | = 10**2 = 100 |
| transaction multiplier | = 10**1 = 10 |
| request multiplier | = 10**0 = 1 |

---

Finally, KB_ANALYSIS combines the requests of all transactions in the workload definition 22 into one access path to each data entity for every type of access defined in the workload. To do this, KB_ANALYSIS sorts all requests in a particular order, e.g., by each "break" in the sort order, i.e., by design, retrieval_mode, verb, adverb, object, select_type, or select_object. KB_ANALYSIS also sums the importance at each break in the sort order.

Structure of the Data Volume Definition

The data volume definition 28 of FIG. 1 describes the amount of data in the database. The system 10 uses this information in several ways, e.g., to optimize the size and number of database files, areas within the files. Briefly, the data volume is defined as the minimum, average, and maximum number of occurrences of each table and column element, as well as the volatility of the tables and elements. For example, an employee database might contain one EMPLOYEES table for all employees in a company. Therefore, the minimum number of occurrences of data entities in the EMPLOYEES table is equal to the number of employees. Over time, however, the number of employees can vary. This variance is accounted for in the average and maximum number of occurrences of data entities in the EMPLOYEES table. For example, if the company expects to double its number of employees, the average and maximum numbers of entities in the EMPLOYEES table is increased in the data volume definition.

Further, because few databases contain static data, i.e., unchanging data, the system allows users to rate the volatility of each table and column element on a scale of one to ten (one for very stable and ten for very volatile). For example, the number of entities in the EMPLOYEES table can be somewhat volatile, e.g., subject to many additions and deletions, and receive a rating of 8. On the other hand, the number of entities in the COLLEGES table, for example, may be quite stable and receive a rating of 2. If the number of entities in a table is likely to change no more or no less than the number of other entities in the database, the table is or column element is typically assigned a volatility rating of 5.

Table 3 below shows an example volume definition for the personnel database. The overall definition is assigned values of zero occurrences and a middle range volatility rating of 5. Likewise, each table and column entry is assigned values to indicate the number of occurrences of entities in the table or column and its volatility. For example, the number of occurrences of data entities in the COLLEGES table has a minimum, average, and maximum value of 16, and a volatility of 5.

TABLE 3

Volume for Schema Personnel
    Default
        Minimum is 0.00
        Average is 0.00
        Maximum is 0.00
        Volatility is 5;
    Table COLLEGES
        Minimum is 16.00
        Average is 16.00
        Maximum is 16.00
        Volatility is 5
        Column COLLEGE_CODE
            Minimum is 16.00
            Average is 16.00
            Maximum is 16.00
            Volatility is 5
        Column COLLEGE_NAME
            Minimum is 16.00
            Average is 16.00
            Maximum is 16.00
            Volatility is 5
        Column CITY
            Minimum is 16.00
            Average is 16.00
            Maximum is 16.00
            Volatility is 5
        Column STATE
            Minimum is 16.00
            Average is 16.00
            Maximum is 16.00
            Volatility is 5
        Column POSTAL_CODE
            Minimum is 16.00
            Average is 16.00
            Maximum is 16.00
            Volatility is 5
    Table DEGREES
        Minimum is 664.00
        Average is 664.00
        Maximum is 664.00
        Volatility is 5;
        Column EMPLOYEE_ID
            Minimum is 664.00
            Average is 664.00
            Maximum is 664.00
            Volatility is 5;
        Column COLLEGE_CODE

TABLE 3-continued

Minimum is 664.00
        Average is 664.00
        Maximum is 664.00
        Volatility is 5;
    Column YEAR_GIVEN
        Minimum is 664.00
        Average is 664.00
        Maximum is 664.00
        Volatility is 5;
    Column DEGREE
        Minimum is 664.00
        Average is 664.00
        Maximum is 664.00
        Volatility is 5;
    Column DEGREE_FIELD
        Minimum is 664.00
        Average is 664.00
        Maximum is 664.00
        Volatility is 5;
Table DEPARTMENTS
    Minimum is 26.00
    Average is 26.00
    Maximum is 26.00
    Volatility is 5;
    Column DEPARTMENT_CODE
        Minimum is 26.00
        Average is 26.00
        Maximum is 26.00
        Volatility is 5;
    Column DEPARTMENT_NAME
        Minimum is 26.00
        Average is 26.00
        Maximum is 26.00
        Volatility is 5;
    Column MANAGER_ID
        Minimum is 26.00
        Average is 26.00
        Maximum is 26.00
        Volatility is 5;
    Column BUDGET_PROJECTED
        Minimum is 26.00
        Average is 26.00
        Maximum is 26.00
        Volatility is 5;
    Column BUDGET_ACTUAL
        Minimum is 26.00
        Average is 26.00
        Maximum is 26.00
        Volatility is 5;
TABLE EMPLOYEES
    Minimum is 100.00
    Average is 100.00
    Maximum is 100.00
    Volatility is 5;
    Column EMPLOYEE_ID
        Minimum is 100.00
        Average is 100.00
        Maximum is 100.00
        Volatility is 5;
    Column LAST_NAME
        Minimum is 100.00
        Average is 100.00
        Maximum is 100.00
        Volatility is 5;
    Column FIRST_NAME
        Minimum is 100.00
        Average is 100.00
        Maximum is 100.00
        Volatility is 5;
    Column MIDDLE_INITIAL
        Minimum is 100.00
        Average is 100.00
        Maximum is 100.00
        Volatility is 5;
    Column ADDRESS_DATA_1
        Minimum is 100.00
        Average is 100.00
        Maximum is 100.00
        Volatility is 5;
    Column ADDRESS_DATA_2
        Minimum is 100.00
        Average is 100.00
        Maximum is 100.00
        Volatility is 5;
    Column CITY
        Minimum is 100.00
        Average is 100.00
        Maximum is 100.00
        Volatility is 5;
    Column STATE
        Minimum is 100.00
        Average is 100.00
        Maximum is 100.00
        Volatility is 5;
    Column POSTAL_CODE
        Minimum is 100.00
        Average is 100.00
        Maximum is 100.00
        Volatility is 5;
    Column SEX
        Minimum is 100.00
        Average is 100.00
        Maximum is 100.00
        Volatility is 5;
    Column BIRTHDAY
        Minimum is 100.00
        Average is 100.00
        Maximum is 100.00
        Volatility is 5;
    Column STATUS_CODE
        Minimum is 100.00
        Average is 100.00
        Maximum is 100.00
        Volatility is 5;
Table JOBS
Minimum is 60.00
Average is 60.00
Maximum is 60.00
Volatility is 5;
    Column JOB_CODE
        Minimum is 60.00
        Average is 60.00
        Maximum is 60.00
        Volatility is 5;
    Column WAGE_CLASS
        Minimum is 60.00
        Average is 60.00
        Maximum is 60.00
        Volatility is 5;
    Column JOB_TITLE
        Minimum is 60.00
        Average is 60.00
        Maximum is 60.00
        Volatility is 5;
    Column MINIMUM_SALARY
        Minimum is 60.00
        Average is 60.00
        Maximum is 60.00
        Volatility is 5;
    Column MAXIMUM_SALARY
        Minimum is 60.00
        Average is 60.00
        Maximum is 60.00
        Volatility is 5;
Table JOB_HISTORY
Minimum is 1096.00
Average is 1096.00
Maximum is 1096.00
Volatility is 5;
    Column EMPLOYEE_ID
        Minimum is 1096.00
        Average is 1096.00
        Maximum is 1096.00
        Volatility is 5;
    Column JOB_CODE
        Minimum is 1096.00
        Average is 1096.00
        Maximum is 1096.00

TABLE 3-continued

Volatility is 5;
    Column JOB_START
        Minimum is 1096.00
        Average is 1096.00
        Maximum is 1096.00
        Volatility is 5;
    Column JOB_END
        Minimum is 1096.00
        Average is 1096.00
        Maximum is 1096.00
        Volatility is 5;
    Column DEPARTMENT_CODE
        Minimum is 1096.00
        Average is 1096.00
        Maximum is 1096.00
        Volatility is 5;
    Column SUPERVISOR_ID
        Minimum is 1096.00
        Average is 1096.00
        Maximum is 1096.00
        Volatility is 5;
Table RESUMES
    Minimum is 0.00
    Average is 0.00
    Maximum is 0.00
    Volatility is 5;
    Column EMPLOYEE_ID
        Minimum is 0.00
        Average is 0.00
        Maximum is 0.00
        Volatility is 5;
    Segmented_string RESUME
        Minimum is 0.00
        Average is 0.00
        Maximum is 0.00
        Volatility is 5;
Table SALARY_HISTORY
    Minimum is 2916.00
    Average is 2916.00
    Maximum is 2916.00
    Volatility is 5;
    Column EMPLOYEE_ID
        Minimum is 2916.00
        Average is 2916.00
        Maximum is 2916.00
        Volatility is 5;
    Column SALARY_AMOUNT
        Minimum is 2916.00
        Average is 2916.00
        Maximum is 2916.00
        Volatility is 5;
    Column SALARY_START
        Minimum is 2916.00
        Average is 2916.00
        Maximum is 2916.00
        Volatility is 5;
    Column SALARY_END
        Minimum is 2916.00
        Average is 2916.00
        Maximum is 2916.00
        Volatility is 5;
Table WORK_STATUS
    Minimum is 12.00
    Average is 12.00
    Maximum is 12.00
    Volatility is 5;
    Colum STATUS_CODE
        Minimum is 12.00
        Average is 12.00
        Maximum is 12.00
        Volatility is 5;
    Column STATUS_NAME
        Minimum is 12.00
        Average is 12.00
        Maximum is 12.00
        Volatility is 5;
    Column STATUS_TYPE
        Minimum is 12.00
        Average is 12.00

TABLE 3-continued

Maximum is 12.00
        Volatility is 5;

The final input to the physical database designer 36, i.e., the design constraints definition 34 is described below.

Structure of the Design Constraints The design constraints definition 34 of FIG. 1 describes the constraints on the physical resources used by the database, and is used to help create the storage schema 38. Briefly, the constraints include the maximum number of users permitted to access the database at one time, the number of storage devices available to store files associated with the database, the maximum amount of space available on any one of the devices, the maximum amount of memory available to applications using the database (roughly half the amount of free memory), and the percentage of available memory to be used by applications. For example, if two thirds of the available system memory is to be used by the database applications, the available memory is 67%.

As an example, Table 4 below shows design constraint definition for the personnel database. The number of storage devices, i.e., disks, is 10 and provides 100,000 blocks of disk storage for 50 users. The maximum amount of memory available to applications is 64 megabytes, and the applications actually use 96% of the available memory.

TABLE 4

Environment for physical_design physical;
        Disks is 10;
        Area_size is 100000 blocks;
        Users is 50;
        Maximum_memory is 64 megabytes;
        Available_memory is 96 percent;

General Operation: Inputs to the Physical Database Designer

FIG. 2 is a flow chart which illustrates the steps of entering the design inputs, i.e., the logical schema 14, the workload 22, the constraints, 34, and the data volume 28. First, the physical database designer 36, creates a physical design into which it will store the results of its work. To initiate this process, the designer 36 prompts the user for the file name of a logical schema 14 and workload 22 to use as inputs to the design process (step 100). Next, the designer 36 creates an instance of the logical schema 14 (step 102) and checks to see that the schema is unique (step 104), i.e., that there are no other instances of the same logical schema and only one logical schema for the physical design. If the schema 14 is not unique, the designer 36 returns an error (step 106). Otherwise, i.e., if the schema 14 is unique, the designer 36 creates instances for each table and column element in the schema (step 108).

In the next processing phase, the designer 36 creates volume instances for each table and column element in the logical schema (step 112). The designer 36 next creates a instance of the workload 22 (step 114) and checks to see that the workload is unique (step 116), i.e., that there is one workload only for the physical design. If the workload 22 is not unique, the designer 36 returns an error (step 118). Otherwise, i.e., if the workload 22 is unique, the designer 36 creates an instance for each request, transaction, program, and application in the workload 22 (step 120). Finally, the designer 36 validates each request instance against the table and column element instances for the logical schema and prompts the user to resolve any inconsistencies (step 122).

Having described the inputs to the designer 36, we next describe the outputs from the designer 36.

Structure of the Runtime Parameters and Creation Parameters

The runtime parameters 42 and creation parameters 44 of FIG. 1 are contained in a command procedure, e.g., a series of Digital Command Language (DCL) commands, which the user can use to implement the improved database. That is, when the command procedure is run, it unloads the data entities from an existing database, optimizes the physical design of the database, and reloads the data entities into a new database built upon the optimized design. Table 5 below shows an example file of a command procedure used to optimize the personnel database.

Briefly, the command procedure shown in Table 5 (supplied in Appendix B) provides the user with information regarding the optimization process it is undertaking and allows the user an opportunity to change the input to various steps in the process. For example, if the database has tables of data entities which depend upon one another, i.e., have matching records in them, then the procedure prompts the user to edit a load sequence so that the tables are loaded in the proper order. Next, the procedure instructs the user as to what is necessary to implement the new database, e.g., a logical schema and enough space to temporarily store the data found in the tables of the existing database. And finally, the procedure informs the user as to how the storage of the data entities has been optimized and offers the user an opportunity to change the optimization.

Once the procedure has provided the user with a description of how the database will be changed, it proceeds to unload the data entities from the existing database. After the data entities are unloaded, the procedure defines the new database, creates storage areas according to the storage schema 38, and creates storage maps for tables, i.e., mapping of the tables to areas of the database. Once the new database is complete, the procedure sorts the unloaded data entities from the old database, and loads the sorted data entities into the new database. The process followed by the command procedure in the runtime parameters 42 and the creation parameters 44 can be further documented in various textual reports.

General Operation: Physical Database Designer Creates Design

FIG. 3 is a flow chart illustrating steps which an expert system in concert with the designer 36 takes in order to generate an optimal physical design. First, the designer 36 analyzes the applications, programs, transactions and requests to determine the access entries to each data entity (step 302). Having analyzed the necessary aspects of each data entity, the designer 36 next retrieves the importance for each request in the transaction and program (step 304) and determines the critical access-to each data entity (step 306)

In the next phase of processing, the designer 36 analyzes the critical access methods entries to determine the desired access mode and access field for each data entity (step 308). Having completed its analysis, the designer 36, then creates access method instances for each unique critical access and data entity combination (step 310). Following step 310, the designer 36 analyzes the critical access entries to determine placement instance for each data entity (step 312). The designer also analyzes transaction instances (for relational databases) or relationship instances (for CODASYL databases) and request instances to determine the interrelationships between data entities (step 314). Once the analysis is complete, the designer 36, generates clusters for interrelated data entities (step 316).

Then, in the final phase of processing, the designer 36 analyzes clusters to determine the mapping of entities to storage areas and storage maps (step 318) and creates instances of storage areas, storage maps, storage partitions, and storage indices (step 320). Once the instances are created, the designer 36 uses the access methods to determine storage index (step 322) and also uses the clusters and placements to determine storage area and storage map (step 324). Finally, the designer 36 prompts the user to determine the storage partitions (step 326) and creates load sequence instances using the volume, request, cluster, and storage map instances (step 328).

General Operation: Physical Database Designer Outputs Design

FIG. 4 is a flow chart illustrating the steps of producing the logical schema 40, the storage schema 38, and the creation parameters 44 and runtime parameters 42. First, the designer 36 creates the-new logical schema 40. To do this, the designer accesses instances of the logical schema, data entities, attributes, and relationships to create model specific Data Definition Language (DDL) file (step 400). Second, the designer 36 creates the storage schema 38. To do this, the designer 36 accesses instances of the record format, storage schema, storage area, storage map, storage index, and storage partition to create model specific DDL file (step 402). Third, the designer 36 creates the creation parameters 44. To do this, the designer 36 accesses instances of the storage area, implementation product, and design constraints to create model specific creation commands (step 404). Fourth, the designer creates the runtime parameters 42. To do this, the designer 36 accesses instances of the implementation product, design constraints, storage area, and storage map to create model specific runtime commands (step 406).

And finally, the designer 36 creates various textual reports such as a design report. To do this, the designer 36 accesses instances of logical schema, access method, placement, cluster, storage schema, storage area, storage map, and load sequence and writes descriptions of each to the report (step 410). The design report 48, is useful, for example, in explaining to a user why the system 10 chose the parameters and schema characteristics it did. The report is also useful in determining if the system used the appropriate inputs to generate the storage schema 38.

The source code for the physical database designer (supplied in Microfiche form in Appendix C and incorporated herein by reference) embodies the software modules described above. The programming languages used are VAX C version 3.0-031. The computer used is a VAX 8820 and the operating system used is VAX/VMS version 5.2. The modules are intended to run under DECwindows, but can also run under a DCL command line interface. Also a list of database design rules and heuristics coded in the relational data manipulation language, e.g., VAX SQL, is included in Appendix A.

This disclosure contains material which is subject to copyright protection. The copyright owner does not object to the facsimile reproduction of the patent document as it appears in the Patent and Trademark Office files, but reserves all other copyright rights.

Other embodiments are within the following claims.

We claim:

1. A process implemented by a computer system for generating a physical design for a database, the database to include data records and index records, the index records to access data stored in the data records, comprising:

retrieving a set of expert rules from a memory of the computer system;

accepting a logical schema as input, said logical schema to describe a logical arrangement of the database;

accepting a data volume definition as input, said data volume definition to describe an amount of data to be stored in the database;

defining a plurality of first operations, each first operation of said plurality of first operations to access the data of the database;

accepting a first workload description as input, said first workload description to specify a first workload for each first operation of said plurality of first operations;

grouping selected first operations of said plurality of first operations into a plurality of second operations, each second operation including at least one first operation, and each first operation being grouped in at least one second operation;

accepting a second workload description as input, said second workload description to specify a second workload for each second operation of said plurality of second operations;

grouping selected second operations of said plurality of second operations into a plurality of third operations, each third operation including at least one second operation, and each second operation being grouped in at least one third operation;

accepting a third workload description as input, said third workload description to specify a third workload for each third operation of said plurality of third operations;

selectively applying said set of expert rules to said logical schema and said data volume description and said first workload description and said second workload description and said third workload description to generate the physical design of the database, the physical design to specify how the data will be physically stored in the data records and how the data records are accessed by the index records.

2. The process of claim 1 wherein each third operation of said plurality of third operations is a computer program, and each second operation of said plurality of second operations is a recoverable database transaction, and said plurality, of third operations include data read operations, data write operations, and data update operations.

3. The process of claim 1 wherein said first workload description, said second workload description, and said third workload description further comprises a relative importance and relative frequency of said first operations, said second operations, and said third operations, respectively, and further comprising:

annualizing said relative frequencies of said first operations, said second operations, and said third operations; and deriving, after annualizing, an absolute importance and an absolute frequency of said first operations.

4. The process of claim 1 further comprising:

grouping selected third operations of said plurality of third operations into a plurality of fourth operations, each fourth operation of said plurality of fourth operations including at least one third operation; and accepting a fourth workload description as input, said fourth workload description to specify a fourth workload for each fourth operation of said plurality of fourth operations;

5. The process of claim 1 wherein the steps of accepting said first workload description and accepting said second workload description and accepting said third workload description further comprises:

entering an output of an event performance collector software.

* * * * *